June 13, 1939.　　　S. W. NICHOLSON　　　2,162,109
VEHICLE WINDOW REGULATOR
Filed March 24, 1937　　　3 Sheets-Sheet 1
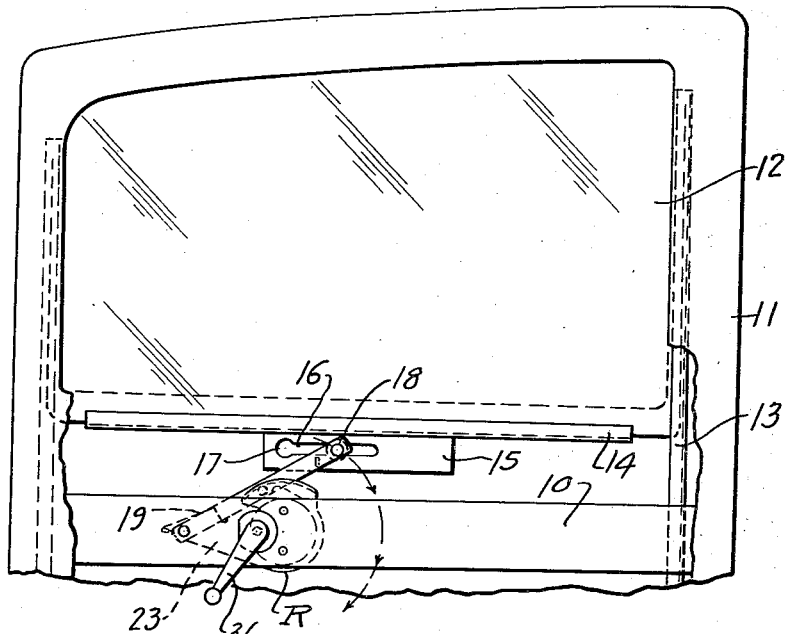
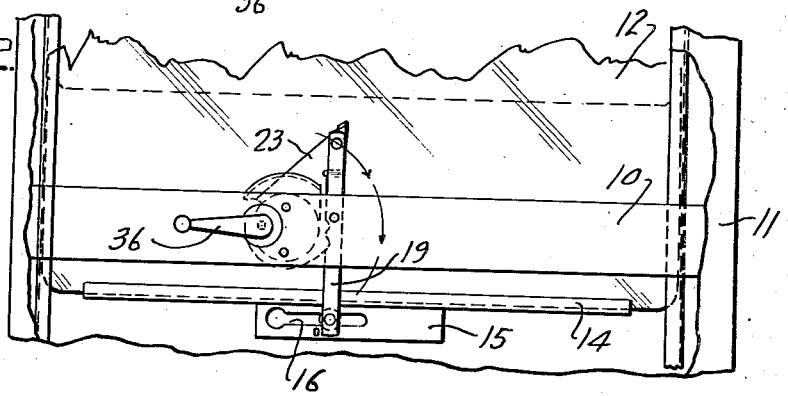
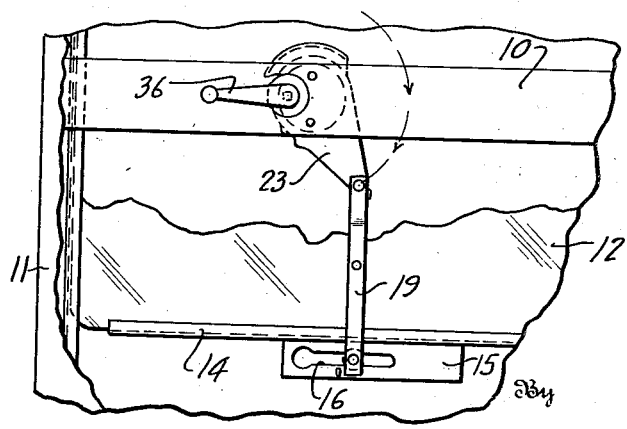
Inventor
Stanley W. Nicholson

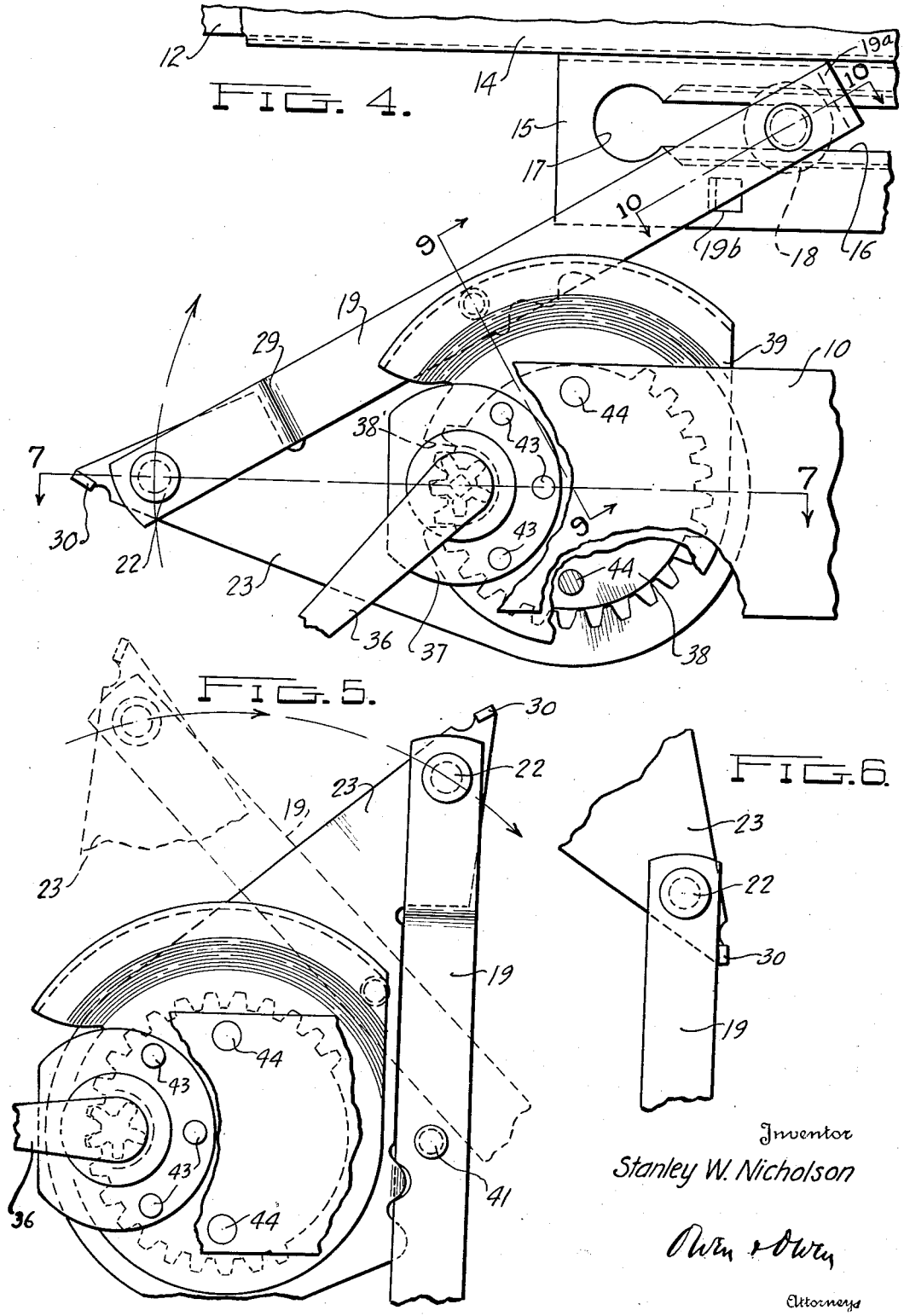

June 13, 1939.  S. W. NICHOLSON  2,162,109
VEHICLE WINDOW REGULATOR
Filed March 24, 1937  3 Sheets-Sheet 3
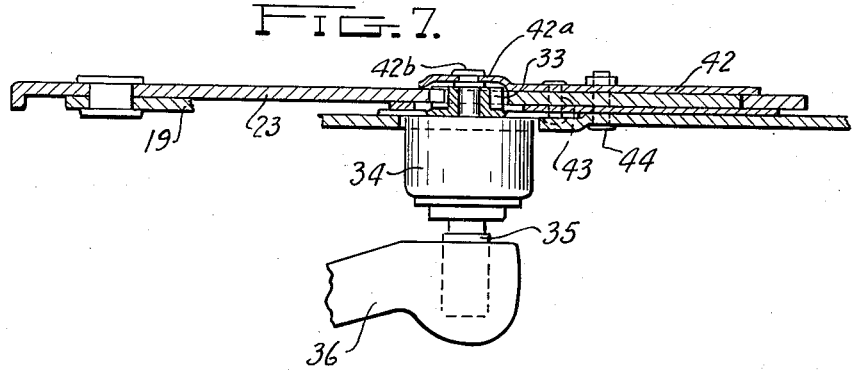
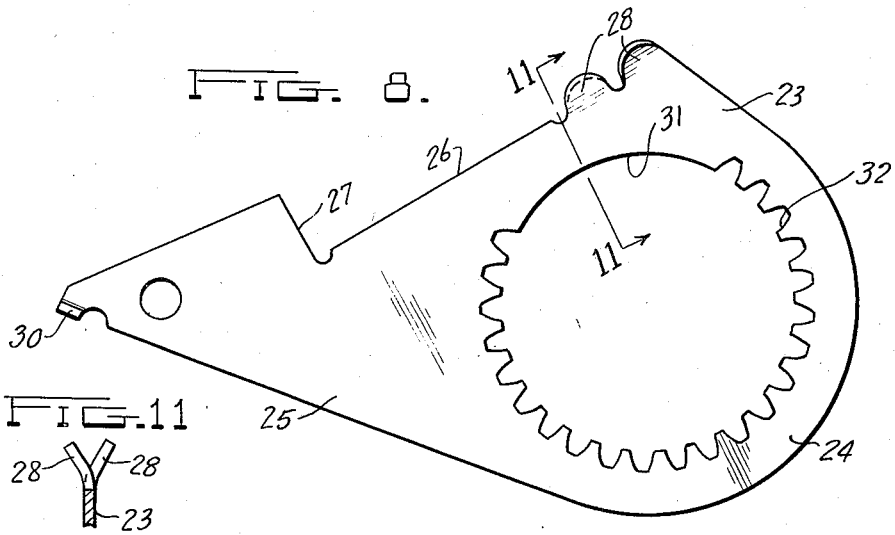
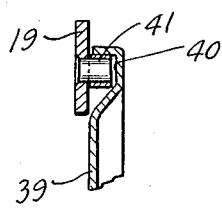
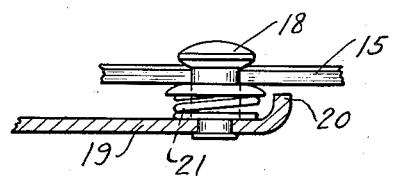
Inventor
Stanley W. Nicholson
By Owen + Owen
Attorneys Patented June 13, 1939

2,162,109

UNITED STATES PATENT OFFICE 2,162,109

VEHICLE WINDOW REGULATOR

Stanley W. Nicholson, Toledo, Ohio, assignor, by mesne assignments, to Detroit Harvester Company, Detroit, Mich., a corporation of Michigan Application March 24, 1937, Serial No. 132,738

14 Claims. (Cl. 268—126)

This invention relates to vehicle window regulators such, for example, as used in opening and closing the windows of automobiles.

An object is to produce a new and improved regulator mechanism which is simple in construction, inexpensive to manufacture, and efficient in operation.

Another object is to produce a regulator assembly of the type having a swinging arm which occupies a minimum amount of space but is effective in actuating the window a sizable distance.

Other objects and advantages of the invention will hereinafter appear, and for purposes of illustration, but not of limitation, an embodiment of the invention is shown on the accompanying drawings in which Figure 1 is a side elevation of a portion of an automobile door in which parts have been broken away to show the regulator mechanism and its connection to the window, the window being shown in its raised or closed position;

Fig. 2 is a fragmentary elevation somewhat similar to Fig. 1 but showing the position that the parts assume when the window is partly opened;

Fig. 3 is a fragmentary side elevation of a portion of the vehicle door showing the position of the parts when the window is in its lowered or open position;

Fig. 4 is an enlarged side elevation of the regulator mechanism shown connected to the window, some of the parts being broken away more clearly to disclose the construction, the parts being shown in the position assumed when the window is in its raised or closed position;

Fig. 5 is a side elevation of the regulator mechanism showing the position of the parts when the window is in partly closed or substantially mid position and showing by dotted lines the position of the parts when the window is moved nearer its closed position;

Fig. 6 is a fragmentary view showing the connection between the crank arm and link of the regulator and the stop for limiting the swinging movement of the link;

Fig. 7 is a sectional elevation substantially on the line 7—7 of Fig. 4;

Fig. 8 is a plan view of the crank arm;

Fig. 9 is a sectional elevation on the line 9—9 of Fig. 4 showing the roller mounted in the cam track; and Fig. 10 is a sectional elevation on the line 10—10 of Fig. 4 showing the connection between the link and the retainer member.

The illustrated embodiment of the invention comprises a regulator mechanism R mounted on the lock board or transverse panel 10 which is suitably secured in the vehicle door 11. Carried by the door 11 is a window glass 12 which slides vertically to cover and uncover the window opening provided in the door, being guided in its vertical movements by channel strips 13. Fixed to the lower edge portion of the window glass 12 is a channel member 14 to which is secured a depending retainer 15 provided with a horizontally elongate slot 16 enlarged at 17 to initially receive the button or roller 18. The button or roller 18 is fixed to the outer end of a link 19 and a washer 20 having a tapered face is urged by a coil spring 21 toward the head of the button or roller 18. On the end of the link 19 is a flange 19$^a$ which cooperates with a tongue 19$^b$ struck out of the retainer 15 to prevent the stud 18 from entering the enlarged opening 17 during operation of the regulator when the window glass is in its lowered position. It will be apparent that these parts do not interfere with the removal of the stud 18, nor the sliding of the stud in other positions. In the upper position of the window glass the flange 19$^a$ and tongue 19$^b$ do not interfere with each other.

The opposite end of the link 19 is pivotally connected by a rivet 22 to a crank arm 23. As shown in Fig. 8, the crank arm 23 has an enlarged inner end portion 24 and the sides generally taper to a smaller portion 25, to which the link 19 is pivoted. It will be noted that the arm 23 is roughly pie-shaped and on one side is provided with a cutaway portion 26 which has an abrupt shoulder 27 at one end and a pair of outwardly projecting teeth or fingers 28 at the opposite end. As shown in Fig. 11, the teeth 28 are bent in opposite directions laterally of the plane of the arm. The link 19 adjacent the shoulder 27 is formed with an offset 29 but the two portions of the link on opposite sides of the offset are disposed parallel to each other.

The arrangement is such that when the link 19 is in the position shown in Fig. 4, it fits between the oppositely extending teeth 28 which provide a stop or abutment for the swinging movement of the link in one direction. Swinging movement of the link in the opposite direction is limited by a flange 30 which is bent outwardly from the narrow end of the crank arm 23.

Formed in the enlarged portion 24 of the crank arm 23 is an opening 31 which has an annular series of gear teeth 32 providing an internal gear and meshing with the teeth 32 is a pinion 33 which forms a part of a wire spring clutch, generally indicated at 34, and from which projects a squared end of a shaft 35 on which is mounted a crank handle 36. The wire spring clutch 34 is well-known to those skilled in this art and detailed description thereof is not considered necessary. Suffice it to say that the clutch operates to prevent retrograde movement of the pinion 33, but turning of the handle 36 releases the clutch and enables the pinion to be readily operated in either direction. The housing for the clutch 34 has a flange 37 which is secured to a centering plate or disk 38 of a size sufficient to fill the opening 31, a cutaway 38' being provided to accommodate the pinion 33.

Abutting against the side of the crank arm 23 is a cam plate 39 which is annular in form and is provided with an outwardly extending curved cam track 40. The cam track 40 receives a stud 41 which is fixed to an intermediate portion of the link 19 and prevents the window glass 12 from being lifted by a force imparted against the free edge thereof, as, for example, by a person grasping the free edge of the window glass and lifting it. For this purpose, the metal of the track 40 is curled over so as to block upward movement of the stud 41. As will hereinafter appear, the stud or roller 41 enters the cam track 40 when the window is in partially open position and when the link 19 is in such position that without the use of means such as a cam track 40, the window could be so lifted. The track 40 and roller 41 also cooperate in moving the window glass downwardly or toward its open position.

Disposed on the other side of the crank arm 23 is an annular side plate 42 which abuts against the centering plate 38. The side plate 42 has an embossed portion 42ª to accommodate a portion of the pinion 33 and to receive pin 42b which forms a bearing for the pinion. The side plate 42, centering plate 38, cam plate 39, and flange 37 of the clutch housing 34 are secured together in unitary relation by three rivets 43. The assembly is secured to the lock board or panel 10 by bolts 44 which pass through the several parts and secure the mechanism securely in position.

In operation, assuming that the window is in its lowermost or open position, the parts assume the position shown in Fig. 3 with the link 19 in vertically disposed relation. Upon turning the handle 36, the crank arm 23 is swung in a counterclockwise direction through the engagement of the pinion 33 with the internal gear 32, the arm 23 swinging about the centering plate 38. As the arm 23 swings upwardly, the window glass 12 is raised by the link 19. After the arm 23 is swung upwardly substantially to the position shown in Fig. 2, the link 19 abuts against the lower portion of the crank arm between the teeth 28, as above pointed out. Thereupon, the crank arm 23 and link 19 operate together as a bell crank lever for continuing the raising movement of the window glass. After the crank arm 23 has moved a slight distance further, the stud or roller 41 enters the cam track 40 and the parts continue to function as a bell crank lever until the window glass has been completely raised to its closed position. In any position of adjustment, it will be readily understood that the window glass 12 will be held in position by the wire spring clutch 34.

Upon turning of the handle 36 in the opposite direction, the above described operation is reversed, the crank arm 23 and link 19 first operating as a bell crank lever and shortly after the stud 41 has left the cam track 40, the link ceases to function as a part of the lever but provides merely the linkage between the crank arm 23 and the glass retainer 15. Some slight lost motion between the button 18 along the slot 16 may take place and enables free operation of the parts.

It will be manifest from the above description that I have produced an exceedingly simple and inexpensive regulator, the parts of which can be produced in the main from sheet metal stampings. The various parts can be readily assembled and when assembled, they are securely and rigidly held together. The unit can be installed in a vehicle by the bolts 44 without difficulty. An important feature of the invention resides in what may be termed a jack knife operation in which a link operates for a portion of the window glass travel as a link and then cooperates with a crank arm to provide a bell crank lever. The crank arm in the form described operates through an arc of 120° and then the link and crank arm operate together as a bell crank lever through a further arc of 120° and in such manner as to avoid a jerky operation but to effect a substantially uniform flow of motion.

Numerous changes in details of construction, arrangement and operation may be effected without departing from the spirit of the invention especially as defined in the appended claims.

What I claim is:

1. A vehicle window regulator comprising a crank arm, means to turn the arm about a horizontal axis, a link connecting the end of the arm to the window, means for establishing a constant angle position between the link and arm during a portion of the path of movement of the arm, and means for positively retaining said link against movement relative to said arm out of said constant and angle position during a portion of the movement of the latter.

2. A vehicle window regulator comprising a crank arm, means to turn the arm about a horizontal axis, a link connecting the end of the arm to the window, means to maintain constant the angle between the link and arm during a portion of the path of movement of the arm, and cam means for positively retaining said link against movement relative to said arm during a portion of the movement of the latter to prevent movement of the window by a force exerted against the free edge thereof.

3. A vehicle window regulator comprising a crank arm, an internal gear concentric with the axis of said arm, a manually operable pinion for driving said gear, a link pivoted at one end to the end of said arm, means to connect the opposite end of said link to the window, and means to cause said arm and link to act as a fixed bell crank lever during a portion of the path of movement of the arm, said last means including a stationary guide and a member on said link adapted to ride in said guide.

4. A vehicle window regulator comprising a crank arm having a relatively large end portion and a relatively small end portion, an internal gear formed in said large end portion, a pinion meshing with said gear, manual means for operating said pinion, a link pivoted at one end to the small end of said crank arm, means for connecting the opposite end of said link to a window, abutment means on said large end of said crank arm and against which an intermediate portion of said link is adapted to bear, and means for holding said link against said abutment means during a portion of the movement of said crank arm.

5. A vehicle window regulator comprising a crank arm having an internal gear at one end, a link pivoted to the opposite end of said arm, means for connecting the opposite end of said link to a window, a manually operated pinion for actuating said internal gear, a centering member filling the opening for said internal gear except for said pinion, a plate having a cam track, and a member on said link adapted to ride in said track during a portion of the movement of said arm.

6. A vehicle window regulator comprising a crank arm, manual means for swinging said arm, a link pivoted to one end of said arm, means for connecting the opposite end of said arm to a window, abutment means on said arm against which said link bears for a portion of the movement of said arm, means providing a curved track, and a member on said link engageable in said track during a portion of the movement of said arm.

7. A vehicle window regulator comprising a crank arm provided with an internal gear at one end, a link pivoted to the opposite end of said arm, means for connecting the opposite end of said link to a window, a manually operated pinion for actuating said gear, abutment means on said arm adjacent said gear against which said link bears during a portion of the movement of said arm, and means for retaining said link in fixed relation to said arm during a predetermined portion of the movement of the latter.

8. A vehicle window regulator comprising a crank having an integral gear at one end thereof, a link pivoted to the opposite end of said arm, means for connecting the opposite end of said link to a window, manual means for operating said gear, abutment means adjacent said gear and against which said link bears during a portion of the movement of said arm, and fixed means for retaining said link at a constant angle to said arm during a portion of the travel of the latter.

9. A vehicle window regulator comprising a crank arm, means to turn the crank arm, a link connected to the window, means for operatively connecting the link to the crank arm to cause the link to operate in extended relation relative to the crank arm during a portion of the turning movement of the crank arm and in a fixed angular relation relative to the crank arm during the remainder of said turning movement, and stationary means lying in the path of movement of said link while it occupies said fixed angular relation to prevent movement of the link out of said relation.

10. A vehicle window regulator comprising a crank arm, means to turn the crank arm, a link connected to the window, means for operatively connecting the link to the crank arm to cause the link to operate as a swinging link actuated by the crank arm during a portion of the turning movement of the crank arm and to cause the link and crank arm to collectively function as a fixed angle bell crank lever during the remainder of said turning movement, and stationary means lying in the path of movement of said link while it is functioning with the crank arm as a bell crank lever to prevent movement of the link relative to the crank arm.

11. A vehicle window regulator comprising a crank arm, means to turn the crank arm, a link connected to the window, means for operatively connecting the link to the crank arm to cause the link to operate in an extended relation relative to the crank arm during a portion of the turning movement of the crank arm and in a fixed angular relation relative to the crank arm during the remainder of said turning movement, and stationary means lying in the path of movement of said link while it occupies said fixed angular relation to prevent movement of the link out of said relation, said stationary means including an arcuate guide and a member on the link engageable in said guide.

12. A vehicle window regulator comprising an oscillatable member, means for oscillating said member, an element pivoted to said member at a point spaced from its axis of movement, means for connecting said element to a window, abutment means on said oscillatable member, said element moving into and out of engagement with said abutment means during oscillatory movement of said member, additional abutment means arranged to cooperate with the first mentioned abutment means only when the member is moving with the element in engagement with said first abutment means, and means carried by the element and engageable with said additional abutment means to cause both of said abutment means while they are cooperatively arranged to hold said element immovable with respect to said member.

13. In a vehicle window regulator, a retainer having a horizontal guideway adapted to be connected to an edge portion of a window glass, a regulator mechanism for raising and lowering the window glass, said mechanism comprising an actuator, an arm operatively connected to said actuator and adapted to partake of a given range of movement, the operative connection between the arm and its actuator being adapted to permit the arm to be free to swing relative to the actuator during a part of its travel through its range of movement, a stud on the end portion of said arm engaging in the horizontal guideway of the retainer, and cooperative means on said retainer and arm, separate from said stud, for limiting movement of the stud in one direction in said guideway when the arm is free to swing but permitting free sliding movement of said stud in said guideway during the remainder of the range of movement of said arm.

14. In a vehicle window regulator, a retainer having a horizontal guideway adapted to be connected to an edge portion of a window glass, a regulator mechanism for raising and lowering the window glass, said mechanism comprising an actuator, an arm operatively connected to said actuator and adapted to partake of a given range of movement, the operative connection between the arm and its actuator being adapted to permit the arm to be free to swing relative to the actuator during a part of its travel through its range of movement, a stud on the end portion of said arm engaging in the horizontal guideway of the retainer, a stop on the end of said arm independent of said stud, and a stop on said retainer, said stops being so arranged that when the arm is free to swing sliding movement of the stud in one direction is limited but free sliding movement of said stud is permitted during movement of the arm through the remainder of its range of movement.

STANLEY W. NICHOLSON.